(12) United States Patent
Seo et al.

(10) Patent No.: US 7,764,866 B2
(45) Date of Patent: Jul. 27, 2010

(54) RECORDING MEDIUM, METHOD FOR SEARCHING FOR CONTENT DATA FROM THE RECORDING MEDIUM, AND METHOD AND APPARATUS FOR REPRODUCING DATA FROM THE RECORDING MEDIUM

(75) Inventors: Kang Soo Seo, Anyang-si (KR); Jea Yong Yoo, Seoul (KR); Byung Jin Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 1224 days.

(21) Appl. No.: 11/292,101

(22) Filed: Dec. 2, 2005

(65) Prior Publication Data

US 2006/0126487 A1    Jun. 15, 2006

Related U.S. Application Data

(60) Provisional application No. 60/634,546, filed on Dec. 10, 2004.

(30) Foreign Application Priority Data

Sep. 27, 2005    (KR) ...................... 10-2005-0089966

(51) Int. Cl.
*H04N 7/00*    (2006.01)
(52) U.S. Cl. .................... 386/95; 369/275.1; 369/275.3; 369/53.3
(58) Field of Classification Search .................... 386/95; 369/275.1, 275.3, 53.3
See application file for complete search history.

(56) References Cited

U.S. PATENT DOCUMENTS

| | | | |
|---|---|---|---|
| 5,644,782 A | 7/1997 | Yeates et al. | |
| 5,930,768 A | 7/1999 | Hooban | |
| 5,982,980 A | 11/1999 | Tada | |
| 6,021,438 A | 2/2000 | Duvvoori et al. | |
| 6,269,371 B1 | 7/2001 | Ohnishi | |

(Continued)

FOREIGN PATENT DOCUMENTS

CA    2 373 641 A1    9/2001

(Continued)

OTHER PUBLICATIONS

Search Report issued Apr. 8, 2008 by the European Patent Office in related European Patent Application No. 05776011.8-2223.

(Continued)

*Primary Examiner*—Thai Tran
*Assistant Examiner*—Girumsew Wendmagegn
(74) *Attorney, Agent, or Firm*—Harness, Dickey & Pierce, P.L.C.

(57) ABSTRACT

A recording medium, a method for searching for content data from the recording medium, and a method and apparatus for reproducing data from the recording medium are disclosed. The recording medium includes a stream area for storing content data, and a reproduction management area for storing a search file capable of searching for the content data. The search file divides the content data into a plurality of scenes. If the content data supports a multi-angle, the search file classifies the scenes according to angles, and includes attribute for specifying the angles. Therefore, the recording medium can easily search for a variety of content data recorded in the recording medium, can provide the searched result, and can effectively reproduce/manage data of the recording medium, resulting in the creation of more convenient functions for a user.

27 Claims, 11 Drawing Sheets

U.S. PATENT DOCUMENTS

| | | |
|---|---|---|
| 6,775,803 B1 | 8/2004 | Chung et al. |
| 6,928,613 B1 | 8/2005 | Ishii et al. |
| 2002/0073105 A1* | 6/2002 | Noguchi et al. ............. 707/200 |
| 2002/0161571 A1 | 10/2002 | Matsushima et al. |
| 2003/0012558 A1* | 1/2003 | Kim et al. .................... 386/97 |
| 2003/0072453 A1 | 4/2003 | Kelly et al. |
| 2003/0105743 A1 | 6/2003 | Ireton |
| 2003/0202431 A1 | 10/2003 | Kim et al. |
| 2003/0228134 A1 | 12/2003 | Kim et al. |
| 2003/0235406 A1 | 12/2003 | Seo et al. |
| 2004/0051812 A1 | 3/2004 | Hayward |
| 2004/0054541 A1 | 3/2004 | Kryze et al. |
| 2004/0101285 A1 | 5/2004 | Seo et al. |
| 2004/0210584 A1 | 10/2004 | Nir et al. |
| 2004/0235402 A1 | 11/2004 | Bjelopavlic et al. |
| 2005/0108466 A1 | 5/2005 | Takashima et al. |
| 2005/0154987 A1* | 7/2005 | Otsuka et al. ................ 715/716 |
| 2006/0013562 A1 | 1/2006 | Sugino et al. |
| 2006/0045481 A1 | 3/2006 | Yahata et al. |
| 2006/0051062 A1 | 3/2006 | Kusaka et al. |
| 2006/0140079 A1 | 6/2006 | Hamada et al. |
| 2006/0143666 A1 | 6/2006 | Okada et al. |
| 2006/0153535 A1 | 7/2006 | Chun et al. |
| 2006/0227973 A1 | 10/2006 | Takashima et al. |

FOREIGN PATENT DOCUMENTS

| | | |
|---|---|---|
| CN | 1647528 | 7/2005 |
| CN | 1898742 | 1/2007 |
| EP | 0 737 912 A2 | 10/1996 |
| EP | 0 737 975 A2 | 10/1996 |
| EP | 0 801 384 A2 | 10/1997 |
| EP | 1 032 229 A2 | 8/2000 |
| EP | 1 408 505 A1 | 4/2004 |
| EP | 1 426 961 A1 | 6/2004 |
| EP | 1 437 737 A2 | 7/2004 |
| EP | 1 513 152 A1 | 3/2005 |
| EP | 1 538 427 A1 | 6/2005 |
| EP | 1 553 769 A1 | 7/2005 |
| EP | 1 718 074 A1 | 11/2006 |
| JP | 11-065996 | 3/1999 |
| JP | 11-249948 | 9/1999 |
| JP | 11-249963 | 9/1999 |
| JP | 11-288580 | 10/1999 |
| JP | 2002-288941 | 10/2002 |
| JP | 2004-214918 | 7/2004 |
| JP | 2006-040473 | 2/2006 |
| KR | 10-2004-0039885 A | 5/2004 |
| TW | 583538 | 4/2004 |
| WO | WO 95/12197 | 5/1995 |
| WO | WO 96/11446 | 4/1996 |
| WO | WO 01/67668 A1 | 9/2001 |
| WO | WO 2004/001752 A1 | 12/2003 |
| WO | WO 2004/001754 A1 | 12/2003 |
| WO | WO 2004/023479 A1 | 3/2004 |
| WO | WO 2004/030356 A1 | 4/2004 |
| WO | WO 2004/042723 A1 | 5/2004 |
| WO | WO 2004/047100 A1 | 6/2004 |
| WO | WO 2004/047104 A1 | 6/2004 |
| WO | WO 2004/114658 A1 | 12/2004 |
| WO | WO 2005/002220 A1 | 1/2005 |
| WO | WO 2005/050528 A2 | 6/2005 |
| WO | WO 2005/052941 A1 | 6/2005 |
| WO | WO 2005/055205 A2 | 6/2005 |
| WO | WO 2005/078727 A1 | 8/2005 |
| WO | WO 2005/091637 A1 | 9/2005 |
| WO | WO 2005/124763 A1 | 12/2005 |

OTHER PUBLICATIONS

Search Report issued Mar. 26, 2008 by the European Patent Office in related European Patent Application No. 07107743.2-2223.

International Search Report issued May 17, 2006 in International Patent Application No. PCT/KR2005/004081.

Office Action issued Aug. 8, 2008 by the Chinese Patent Office in counterpart Chinese Application No. 200580031490.0 (with English language translation).

Search Report issued Sep. 17, 2008 by the European Patent Office in counterpart European Patent Application No. 05823683.7.

Office Action issued Apr. 29, 2010 by the Chinese Patent Office in counterpart Chinese Application No. 200580038705.1 (with English language translation).

* cited by examiner

US 7,764,866 B2

RECORDING MEDIUM, METHOD FOR SEARCHING FOR CONTENT DATA FROM THE RECORDING MEDIUM, AND METHOD AND APPARATUS FOR REPRODUCING DATA FROM THE RECORDING MEDIUM

This application claims the benefit of Korean Patent Application No. 10-2005-0089966 filed on Sep. 27, 2005, which is hereby incorporated by reference as if fully set forth herein.

This application claims the benefit of the U.S. Provisional Application No. 60/634,546, filed on Dec. 10, 2004, in the name of inventors Kang Soo SEO, Jea Yong YOO, and Byung Jin Kim, entitled "METHOD OF ENHANCED SEARCH FOR HIGH DENSITY OPTICAL DISC", which are hereby incorporated by reference as if fully set forth herein.

BACKGROUND OF THE INVENTION

1. Field of the Invention

The present invention relates to a recording medium, and more particularly to a recording medium including a search file capable of searching for content data recorded in the recording medium, a method for searching for content data using the recording medium, and a method and apparatus for reproducing data from the recording medium.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

Specifically, a variety of titles equipped with content data composed of various attribute data can be recorded in the BD, for example, a first title in which a moving-image movie based on an MPEG2 compression scheme is recorded, a second title in which interactive information including another moving-image movie executed by a Java program is recorded, and a third title in which data is recorded in terms of Web-languages.

However, a unified standard specification for searching for the aforementioned content data of various attributes, and reproducing the retrieved content data has not yet been established, such that many limitations and problems occur in developing a BD-based optical recording/reproducing device.

SUMMARY OF THE INVENTION

Accordingly, the present invention is directed to a recording medium, a method for searching for content data from the recording medium, and a method and apparatus for reproducing data from the recording medium that substantially obviate one or more problems due to limitations and disadvantages of the related art.

An object of the present invention is to provide a recording medium including a search file capable of searching for content data recorded in a recording medium.

Another object of the present invention is to provide a recording medium equipped with a search file for searching for content data capable of supporting multiple angles (hereinafter referred to as a multi-angle), a method for searching for content data using the recording medium, and a method and apparatus for reproducing data from the recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium comprises: a stream area in which content data is recorded; and a management area in which a search file for searching for content data divided into a plurality of scenes contains metadata of individual scenes, wherein the metadata contains attribute for specifying individual angles contained in the metadata and the scenes are specified according to each angle.

Preferably, the attribute for specifying the angles is indicative of angle number (angle_num).

Preferably, the scene for each angle is reproduced by a plurality of PlayItems including at least one PlayItem capable of supporting the angles.

Preferably, if the scene for each angle spans more than one PlayItems, the attribute for specifying the angle of the scene is valid only in the PlayItem for supporting the angle.

Preferably, the metadata further includes entry_point as the attribute of the scene.

Preferably, the metadata further includes duration as the attribute of the scene.

Preferably, the search file is contained in a metadata (META) directory.

In another aspect of the present invention, there is provided a method for searching for content data comprising the steps of: a) providing scene element contained in a scene according to a content search command; and b) providing at least one scene corresponding to the selected scene element from among the provided scene element, wherein the provided scenes can be specified according to individual angles.

Preferably, the scenes specified according to the angles are searched by metadata including attribute capable of specifying the angles.

Preferably, the attribute for specifying the angles is indicative of angle number.

Preferably, the scene for each angle is reproduced by a plurality of PlayItems including at least one PlayItem capable of supporting the angles.

Preferably, the scene for each angle includes at least one PlayItem capable of supporting the angle.

Preferably, the scene for each angle extends to some PlayItems capable of supporting the angle.

In another aspect of the present invention, there is provided a method for reproducing data from a recording medium comprising the steps of: a) searching for content data according to a content search command; b) providing at least one scene specified for each angle; and c) reproducing the searched scene according to attribute for specifying an angle of the scene.

Preferably, the attribute for specifying the angle is contained in metadata associated with the searched scene.

Preferably, the method further comprises the steps of: determining whether the attribute for specifying the angle is valid in a PlayItem capable of reproducing the searched scene; if the attribute for specifying the angle is valid in the PlayItem, reproducing the searched scene at an angle of the scene; and if the attribute for specifying the angle is invalid in the PlayItem, reproducing the searched scene at a default angle.

Preferably, the method further comprises the step of: if the searched scene is reproduced by a plurality of PlayItems, determining whether the attribute for specifying the angle according to the PlayItems is valid in a corresponding PlayItem.

In yet another aspect of the present invention, there is provided an apparatus for reproducing data from a recording medium comprising: a recording/reproducing unit for reading a signal recorded in the recording medium; a controller for transmitting a content search command to the recording/reproducing unit; and searching for at least one scene specified according to individual angles, and reproducing the searched scene according to attribute for specifying the angle of the scene.

Preferably, the controller determines whether the attribute for specifying the angle of the searched angle is valid in a PlayItem reproducing the scene, reproduces data corresponding to the angle of the searched scene if the attribute is valid, and reproduces data corresponding to a default angle if the attribute is invalid.

Preferably, if the searched scene is reproduced by a plurality of PlayItems, the controller determines whether the attribute for specifying the angle of the searched scene is valid in a corresponding PlayItem.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
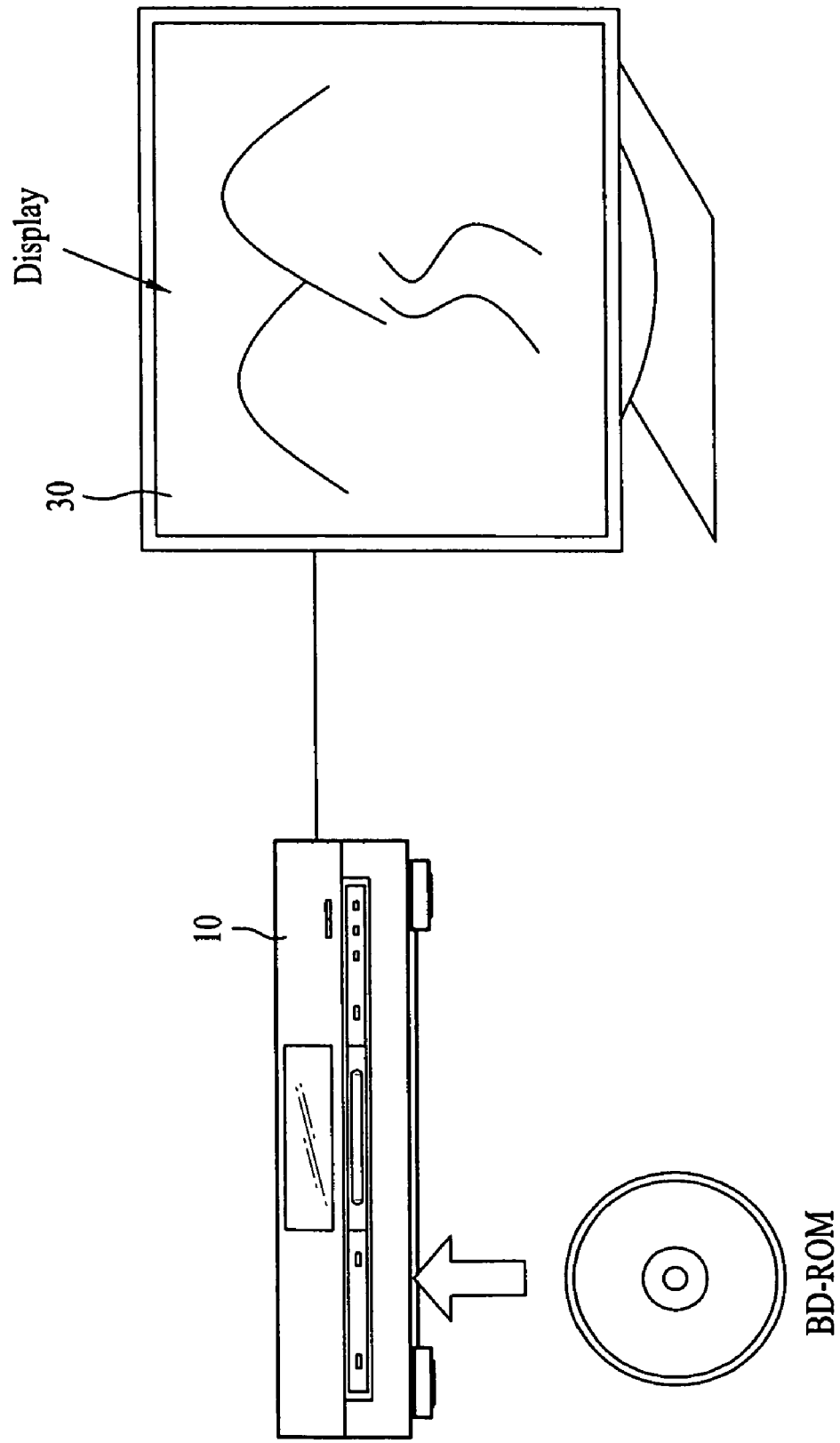
FIG. 1 is a conceptual diagram illustrating a method for reproducing data of a read-only recording medium using an optical recording/reproducing device according to the present invention.

Reference will now be made in detail to the preferred embodiments of the present invention, examples of which are illustrated in the accompanying drawings. Wherever possible, the same reference numbers will be used throughout the drawings to refer to the same or like parts.

A recording medium, and a method for searching for content data from the recording medium according to the present invention will hereinafter be described with the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes. For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "Title" is indicative of a reproduction unit interfacing with a user, and each title is linked to a specific Object, such that a stream associated with a corresponding title recorded in a disc is reproduced according to a command or program stored in the Object.

The term "Content" is indicative of content data of the title, and is specific data supplied from a disc author.

In association with the above-mentioned description, the content data is composed of a plurality of scenes. The present invention constructs specific information, which is capable of effectively searching for a specific scene of the content data, in the form of a search file, such that the disc author manufactures an optical disc using the search file.

In association with the above-mentioned description, the term "Scene" is indicative of a piece of content data, which is divided into a plurality of pieces at intervals of a predetermined time. In other words, a scene in the present invention is a time based description unit of a metadata in a search file.

The term "Object" is indicative of reproduction management information including a command or program for reproducing the disc. In other words, a variety of Objects are present in the disc, are linked to a specific title, or are connected to other Objects. Therefore, the above-mentioned Objects are pre-designed according to intentions of a manufacturer or author of the disc, are recorded in the disc, and increase the number of scenarios for reproducing data of the disc. In other words, the term "Object" is indicative of a reproduction management unit including a command or program for managing a reproduction scenario of data recorded in the disc.

FIG. 1 is a conceptual diagram illustrating a method for reproducing data of a read-only recording medium using an optical recording/reproducing device according to the present invention. In more detail, FIG. 1 shows a process for reproducing data from a read-only recording medium (i.e., a BD-ROM) for use in an optical recording/reproducing device 10.

The optical recording/reproducing device 10 can record/reproduce data in/from various optical discs having different formats. If necessary, the optical recording/reproducing device 10 can record/reproduce specific data in/from only a specific optical disc such as a BD, or can reproduce the data from the optical disc without recording the data in the same. It should be noted that the present invention uses a BD-player capable of reproducing data from the BD-ROM based on a BD format as a preferred embodiment for the convenience of description. It is well known in the art that the optical recording/reproduction device 10 is also applicable to a drive embedded in a specific device such as a computer.

The optical recording/reproducing device 10 reproduces data from the BD-ROM, reads data from the BD-ROM, performs a signal process and a decoding process on the read data according to attribute of the read data, and transmits the signal processed result and the decoding result to a display 30 connected to the optical recording/reproducing device 10, such that a user can view the signal processed result and the decoding result on the display 30.

Figure 2:
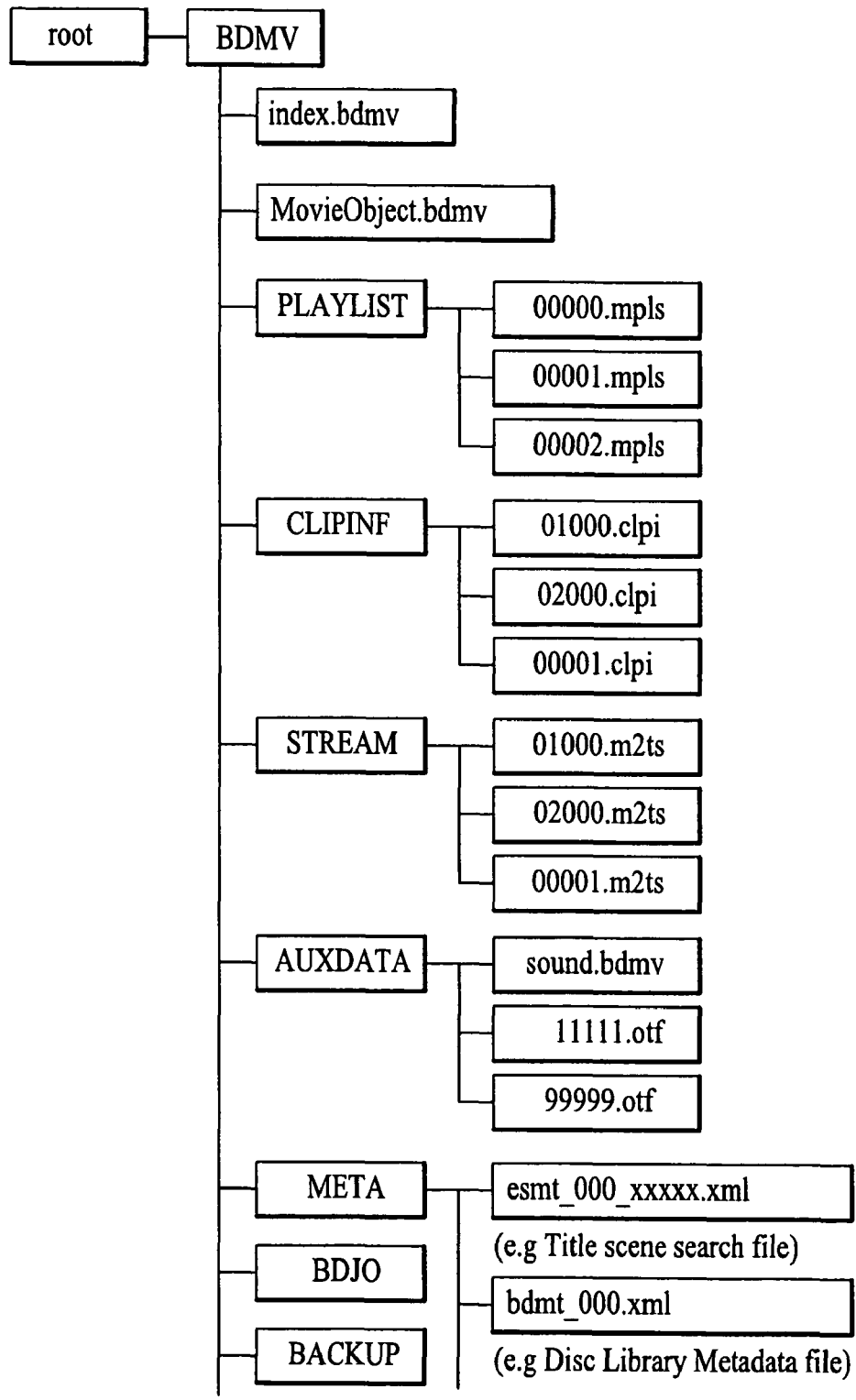
FIG. 2 is a conceptual diagram illustrating a file structure recorded in an optical disc acting as a recording medium according to the present invention.

FIG. 2 is a conceptual diagram illustrating a file structure recorded in an optical disc such as BD-ROM according to the present invention.

The above-mentioned file structure shown in FIG. 2 will hereinafter be described.

The reproduction/management file structure according to the present invention includes one or more BDMV directories in a single root directory. The BDMV directory includes not only an index file "index.bdmv" acting as a general file (i.e., an upper file) capable of guaranteeing user interactivity, but also an Object file "MovieObject.bdmv". The file structure includes a variety of directories for storing information of actual data recorded in a disc and other information associated with a method for reproducing the data, for example, a PLALIST directory, a CLIPINF directory, a STREAM directory, a BDJO directory including a BD-J Object file, and an AUXDATA directory composed of auxiliary data associated with disc data reproduction. The above-mentioned directories and a variety of files included in the directories will hereinafter be described.

The STREAM directory includes a plurality of AV (Audio and Video) stream files recorded in a disc according to a specific format. For example, the STREAM directory uses extension names of stream files (01000.m2ts, . . . ) as a specific extension name "*.m2ts". Generally, the stream file contains moving image data as content data of the present invention.

The CLIPINF directory contains one Clip information file for each Clip AV stream file. Particularly, the Clip information files (*.clpi) contain attribute and timing information of the stream files therein. The Clip information files (01000.clpi, . . . ) connected to the stream files (*.m2ts) on a one-to-one basis are generically named a "Clip" in a BD standard. In other words, this means that a single stream file (*.m2ts) must correspond to a Clip information file (*.clpi).

The PLAYLIST directory includes a plurality of PlayList files (00000.mpls, . . . ). Each PlayList file (*.mpls) includes one or more PlayItems for designating a playing interval during which a specific clip is reproduced. The PlayItem includes information associated with a specific clip to be reproduced, i.e., information associated with a reproduction start time (IN-Time) and other information associated with a reproduction termination time (OUT-Time) of a clip determined to be a clip name (Clip_Information_File_name) contained in the PlayItem.

The PlayList file (*.mpls) is used as a basic reproduction/management file unit contained in an overall reproduction/management file structure, such that it can reproduce a desired clip using a combination of one or more PlayItems.

The PlayList file (*.mpls) is operated by a command or program of the above-mentioned Object. From the viewpoint of a disc reproduction scenario, the Object executes or manages a dynamic scenario, and the PlayList file (*.mpls) executes or manages a static scenario.

The AUXDATA directory includes an additional data file for reproducing data of the disc. For example, the AUXDATA directory includes a sound file "Sound.bdmv" for providing a user with click sound data and menu sound data during a data reproduction time, and a font file "11111.otf" for providing the user with font information when a text subtitle is reproduced.

The META directory includes metadata acting as "Data about Data". According to the present invention, a search file is contained in the META directory. In addition, other metadata such as Disc Library metadata is present in the aforementioned META directory. The search file is characterized in that it uses a unique file name distinguished from other metadata files.

In other words, the META directory is contained in the BDMV directory. For example, the search file associated with the present invention is recorded as a specific file name such as "esmt_OOO_xxxxx.xml".

Head information "esmt_" contained in the aforementioned file name is used as a file descriptor code distinguished from other metadata. For example, all files beginning with the "esmt_" are indicative of search files, and all files beginning with "bdmt_" information are indicative of Disc Library files.

Specific information "_OOO_" contained in the aforementioned file name is used as a language code for specifying supported language information. For example, a search file composed of the English language may be denoted by "_eng_", a search file composed of the Korean language may be denoted by "_kor_", a search file composed of the Japanese language may be denoted by "_jpn_", and a search file composed of a plurality of languages may be denoted by "_mul_".

The last information "_xxxxx" of the aforementioned file name is used as an ID code for specifying individual files of a PlayList file (e.g., 00000.mpls, . . . ) indicative of an object of search information of a corresponding search file. For example, if a specific title of the disc is reproduced by a specific PlayList file "00000.mpls", a file name of the English search file for searching for content data of the tile is composed of "esmt_eng_00000.xml".

Figure 3:
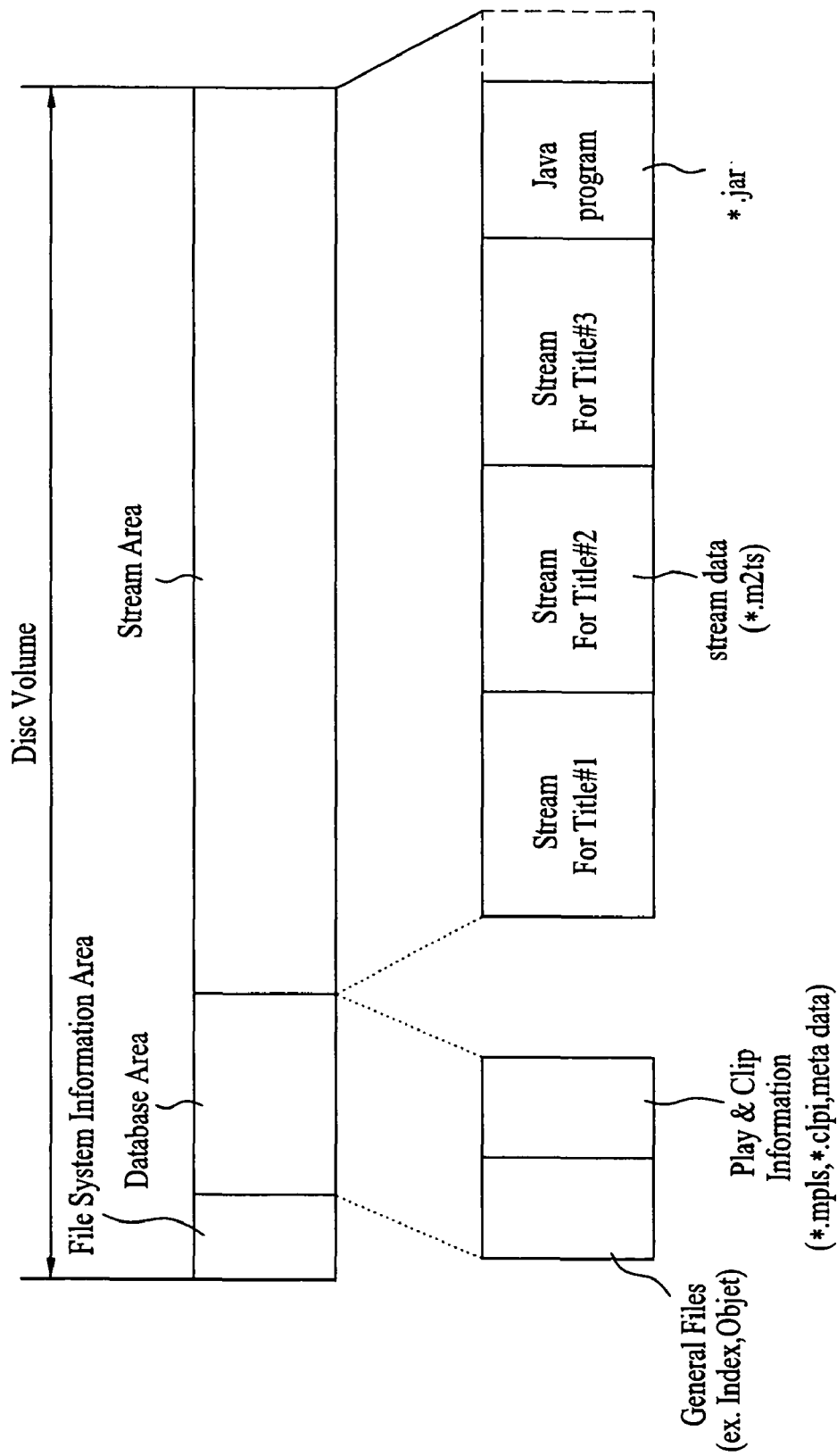
FIG. 3 is a structural diagram illustrating a data record structure recorded in a recording medium according to the present invention.

FIG. 3 is a structural diagram illustrating a data record structure recorded in a recording medium according to the present invention. In more detail, FIG. 3 shows a disc record format of information associated with the aforementioned file structure. As shown in FIG. 3, from the viewpoint of an inner area of the disc, the above-mentioned disc structure sequentially includes a file system information area serving as system information for managing overall files, a database area for recording an index file, an Object file, a PlayList file, a Clip information file, and a metadata file to reproduce the recorded stream (*.m2ts), and an AV stream area for recording a plurality of streams composed of audio data, video data, and graphic data, etc.

Particularly, it should be noted that moving-image content data can be recorded in the stream area of the disc, and information for searching for the aforementioned moving-image content data is recorded as the aforementioned metadata file in a search file as previously stated above.

A specific area for recording file information capable of reproducing content data contained in the stream area is referred to as a management area. The aforementioned file system information area and the aforementioned database area serve as the management area. Individual areas of FIG. 3 are shown as an example, so that it should be noted that the present invention is not limited to an exemplary arrangement structure of individual areas as shown in FIG. 3, and is applicable to other examples if required.

Figure 4:
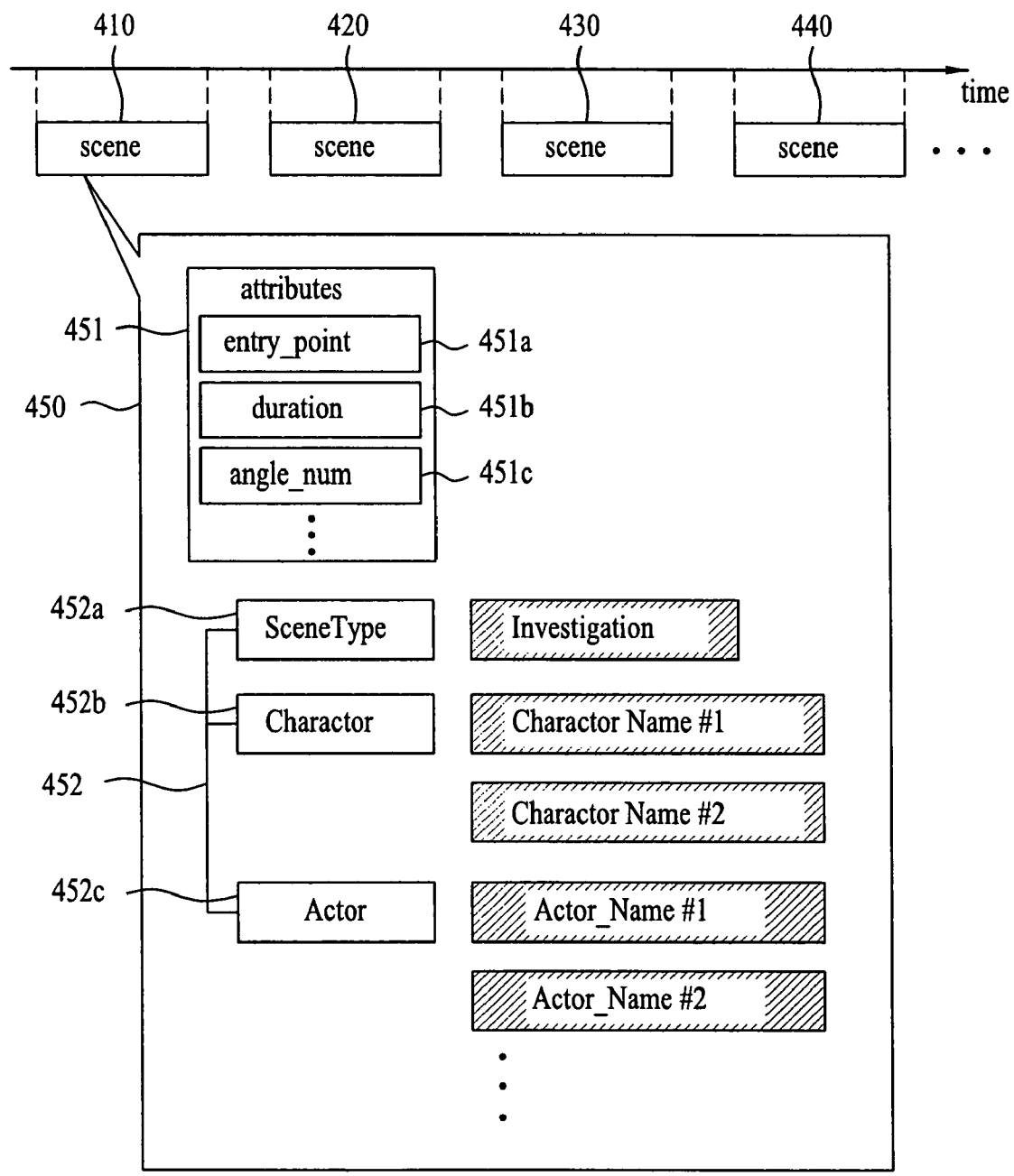
FIG. 4 is a structural diagram illustrating a metadata file structure for searching for content data according to the present invention.

FIG. 4 is a structural diagram illustrating a metadata file structure for searching for content data according to the present invention. Referring to FIG. 4, content data is divided into a plurality of scenes, and metadata corresponding to each scene indicates a specific scene contained in the content data. The metadata for searching for content data is composed of a plurality of scenes 410, 420, 430, and 440 divided by a disc author.

The metadata includes attribute and scene element of individual scenes. The attribute is indicative of characteristic information of a corresponding scene, such that each scene is defined by the attribute. The attribute of the scene includes "entry_point" 451a and duration 451b, etc. The "entry_point" 451a is used to specify the start point of each scene on the basis of a PlayList Global Time Axis. The "duration" 451b is used with scene element to specify the duration of each scene. In association with the above-mentioned description, the scene may have a predetermined point between an entry_point and another entry_point of the next scene. It may also be defined by both an entry_point indicative of a scene start point and a duration indicative of a duration time of the scene.

The present invention is characterized in that information for specifying individual angles is applied to the aforementioned attribute. For example, the "angle_num" 451c of FIG. 4 may be used as the aforementioned attribute, and a detailed description thereof will be described later with reference to FIG. 5. It is well known to those skilled in the art that not only the aforementioned attribute, but also other attribute for specifying individual scenes may be applied to the present invention.

The scene element is an element describing the scenes of a referenced media clip. In other words, the scene element is indicative of scene constituent element information. The scene can be denoted by a scene type element describing the scenery or the situation of the scene, a character element describing the characters appearing on a corresponding scene, and an actor element describing a person acted as a character in the scene, etc. The scene type, the character, and the actor, etc. serve as constituent elements of the scene and their associated information serve as scene element. In other words, the scene type 452a, the character 452b, and the actor 452c, etc. are scene element of individual scenes, and are contained in metadata of the present invention. The scene element serves as a descriptor associated with a specific scene interfacing with a user during a content search process. Also, there is another descriptor "authordef". The "authordef" element is used to express any additional information that a content provider intended to add. The metadata file for searching for content data may include not only the afore- mentioned scene element, but also other descriptors. The aforementioned scene elements may also have other elements of metadata as child element.

Figure 5:
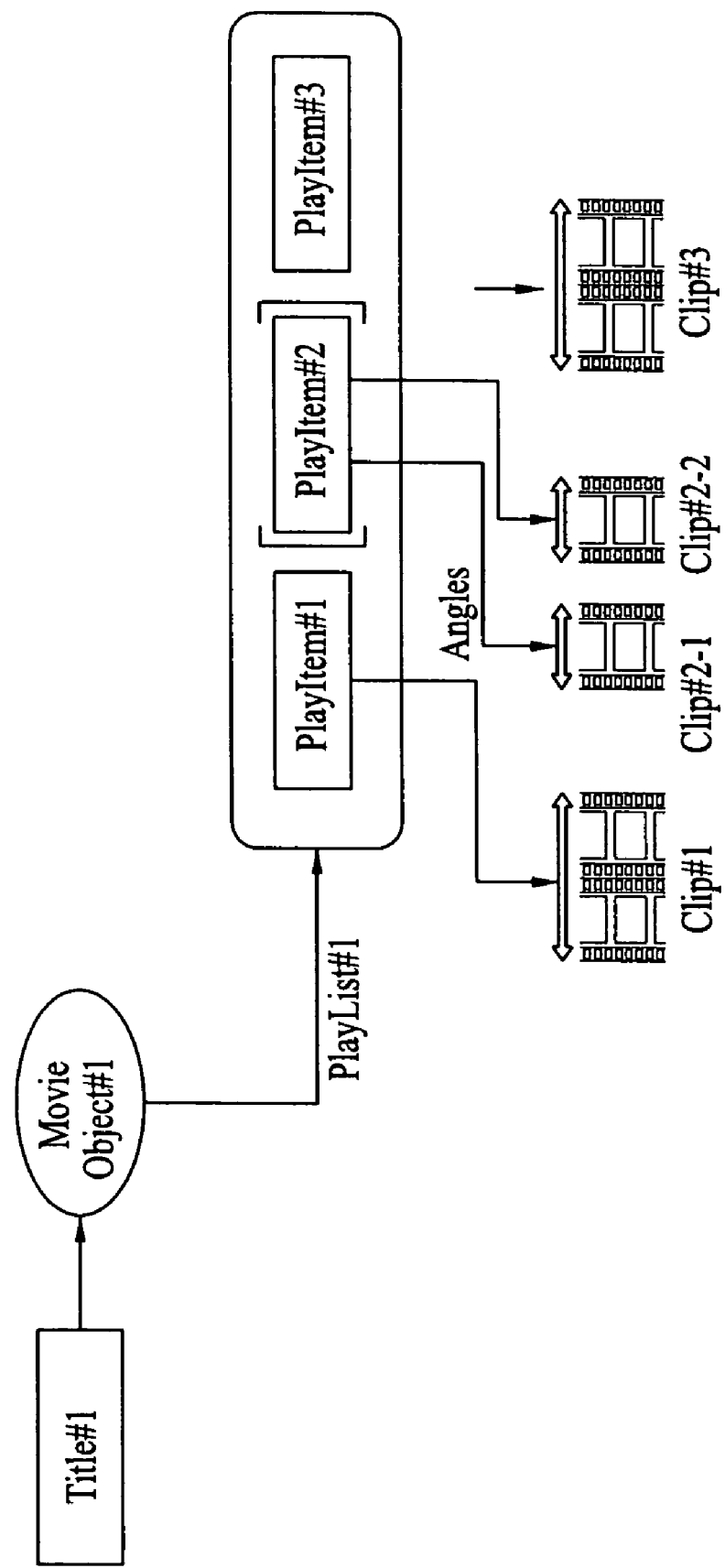
FIG. 5 is a conceptual diagram illustrating a process for implementing a multi-angle title according to the present invention.

FIG. 5 is a conceptual diagram illustrating a process for implementing a multi-angle title according to the present invention. An image supplied to a user may be variably viewed by the user's eyes according to a variety of angles. For example, provided that the user views a specific character at the back or the front during a play time of a specific game, or views the specific character in the sky, or views the specific character from the viewpoint of different characters or actors, different images may be viewed by the user's eyes. In other words, the term "Angle" is indicative of an angle supplied from content data, a viewpoint or a view position. If the content data provides the user with a variety of angles, these angles are referred to as a multi-angle title.

From the viewpoint of a file structure, the Multi-angle title has a PlayItem with multi-angle structure that refers to parallel Clips. Therefore, a variety of content data can be implemented on the same time axis using the multi-angle. The multi-angle will hereinafter be described with reference to FIG. 5.

If a specific Title #1 to be reproduced is selected, a specific PlayList #1 is executed by a command of a MovieObject #1 corresponding to the selected Title #1. The PlayList #1 shown in FIG. 5 includes three PlayItems (i.e., PlayItems #1, #2, and #3). The first PlayItem #1 from among the aforementioned three PlayItems refers to a clip #1, such that it includes the IN-Time information of a single clip. The third PlayItem #3 (PlayItem #3) refers to a clip #3, such that it includes the OUT-Time information of a single clip.

However, the PlayItem #2 (PlayItem #2) refers to two clips (i.e., a clip #2-1 and a clip #2-2). Therefore, a player may allow the PlayItem #2 to reproduce data using the clip #2-1 according to a user command, or may also allow the PlayItem #2 to reproduce data using the clip #2-2 according to another user command. Therefore, the title #1 includes two reproduction paths.

In conclusion, the aforementioned multi-angle structure includes a variety of reproduction paths. In association with a scene contained in content data, different scene elements are assigned to individual angles, for example, different scene types, different actors, different characters, and different items, etc., such that different characteristics appear at individual angles.

In association with the above-mentioned description, content data capable of supporting a multi-angle enables individual angles to have different scenes, and attribute for specifying the angles is applied to scene metadata. The attribute for specifying the angles is represented by "angle_num". The "angle_num" is indicative of an angle number. The angle number can be acquired by adding a predetermined number of 1 to an angle_ID indicative of ID information of individual angles contained in a PlayItem.

In association with the above-mentioned description, although the angle_num is used as attribute for specifying individual angles according to the present invention, it may be modified as necessary within the scope of the present invention without being limited to the term "angle_num".

FIGS. 6~8b show content search result and an associated content reproduction example according to the present invention.

Figure 6:
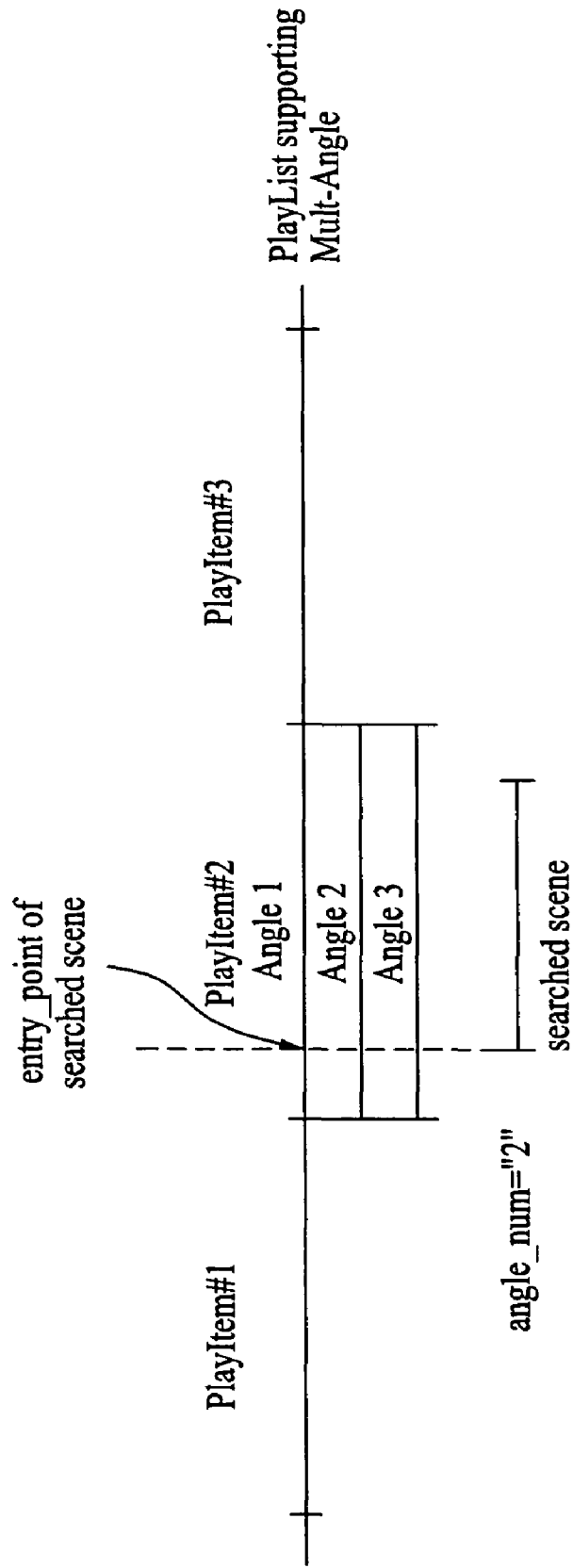
FIG. 6 is the resultant example acquired from a PlayList capable of supporting a multi-angle according to the present invention.
Figure 7:
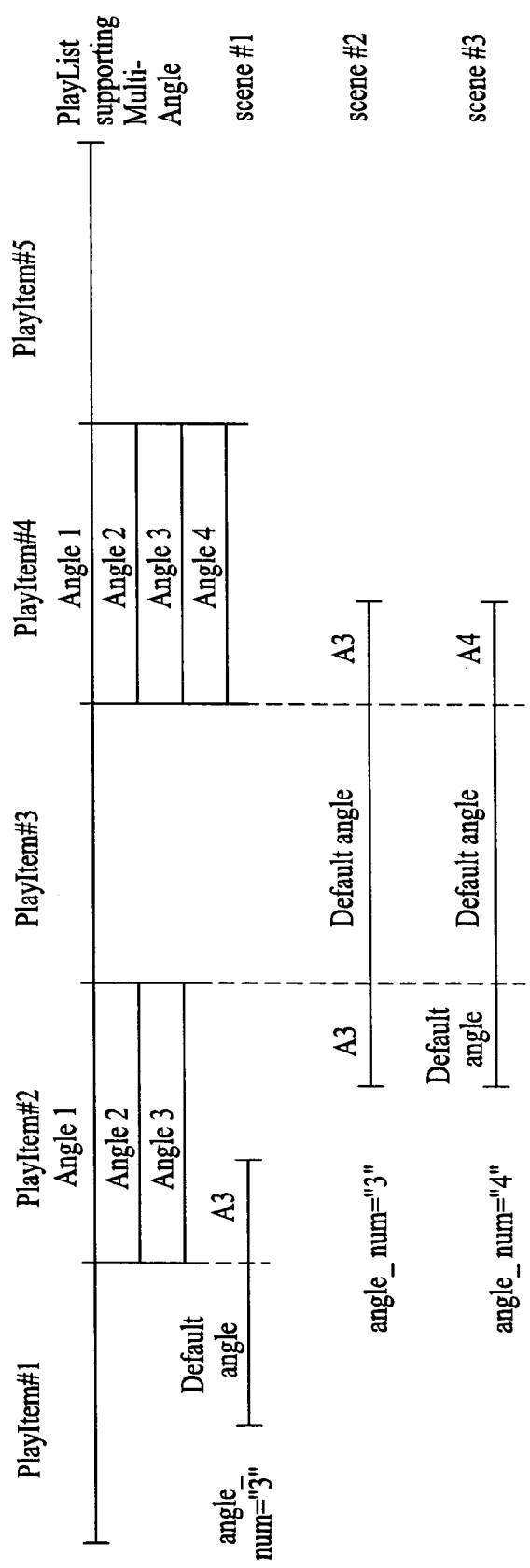
FIG. 7 is a conceptual diagram illustrating a process for selecting an angle when the result of the present invention spans a plurality of PlayItems, and performing data reproduction according to the present invention.
Figure 8A:
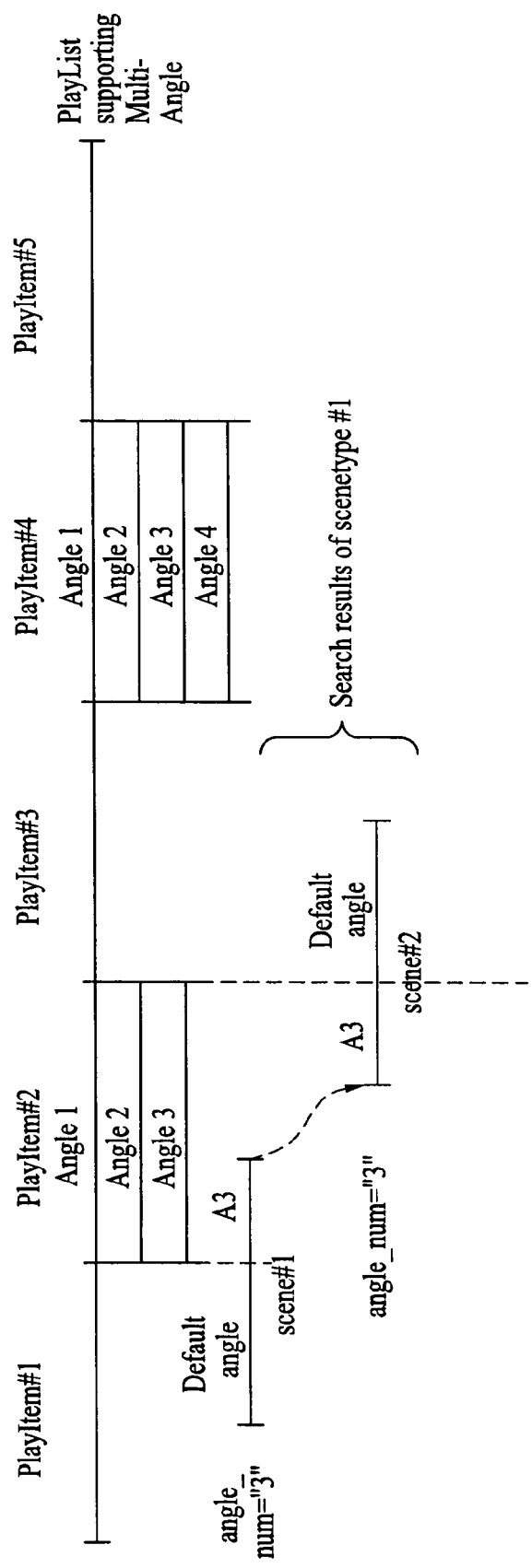
FIGS. 8A-8B are conceptual diagrams illustrating processes for searching for content data from a multi-angle title, and performing data reproduction according to the present invention.
Figure 8B:
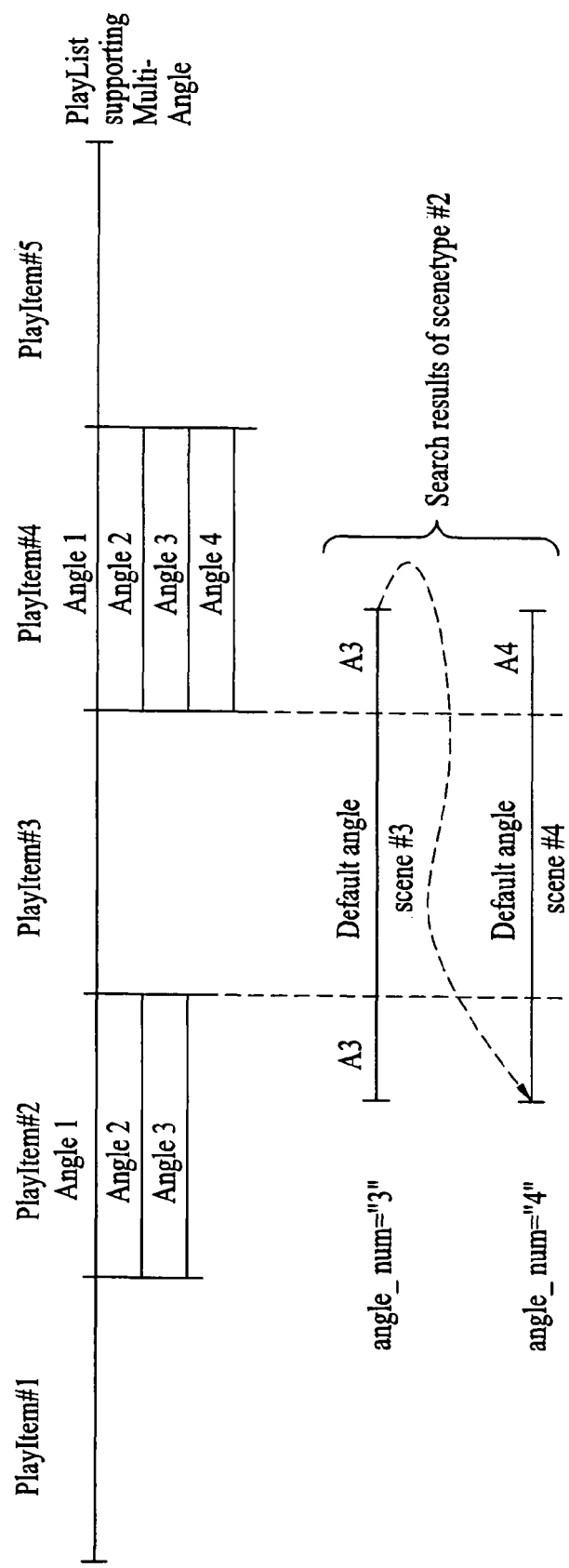

FIG. 6 shows an example in which a searched scene spans a single PlayItem including a multi-angle. FIG. 7 shows an example in which a searched scene spans more than one PlayItems. FIGS. 8a~8b show examples in which searched scenes are successively reproduced by the content search process according to the present invention. Operations of FIGS. 6~8b will hereinafter be described.

FIG. 6 is the resultant example acquired from a PlayList capable of supporting a multi-angle according to the present invention.

Referring to FIG. 6, a PlayList includes three PlayItems (PlayItems #1, #2, and #3), and the second PlayItem #2 from among the three PlayItems has a multi-angle structure composed of three angles (Angles 1, 2, and 3). The scene searched by a content search command extends to the second PlayItem #2 contained in the above-mentioned PlayList, and is equal to a scene of an angle number "2" in the aforementioned PlayItem #2. Therefore, upon receiving a command for reproducing the aforementioned searched scene, the player reproduces a clip corresponding to the Angle 2.

In the present invention, entry_points of different scenes may be duplicated. Instead, the attribute of angle_num according to the present invention shall be specified for scenes supporting multi-angle. Therefore, those scenes with duplicated entry_points are distinguished with the value of angle_num assigned per each scene.

According to the present invention, searched scenes of one search command may overlap entirely or partially as long as the value of an angle_num attribute distinguishes overlapped searched scenes.

According to scenes of individual angles contained in a corresponding PlayItem can be specified by attribute for specifying each angle, and data reproduction can be differently performed at an angle of the scene.

FIG. 7 is a conceptual diagram illustrating a process for selecting an angle when the result of the present invention spans more than one PlayItems, and performing data reproduction according to the present invention.

Referring to FIG. 7, scenes searched by the content search command may be entirely or partially overlapped with each other by the entry_point or duration, such that the search or reproduction process of the overlapped scenes may incur many problems.

The present invention identifies individual scenes using attribute of specifying an angle of a scene, such that a plurality of scenes overlapped with each other on the same PlayList global time axis as shown in exemplary scenes #2~#3 of FIG. 7.

In association with the above-mentioned description, searched scenes of FIG. 7 are arranged in the order of entry_point numbers of individual scenes, and scenes having the same entry_point are arranged in ascending angle information order.

In the meantime, scenes manufactured by the content provider may span more than one PlayItems. In this case, individual PlayItems may have different multi-angle structures. That is, individual PlayItems may have different angle_nums. Therefore, a rule should be defined.

In association with the above-mentioned description, attribute for specifying angles of a scene is valid only within a PlayItem capable of supporting a corresponding angle. In other words, the attribute for specifiying angles of a scene can cover only a period within a PlayItem and cannot cross over boundaries of multi-angle. Detailed description thereof will hereinafter be described with reference to FIG. 7.

The angle number (angle_num) of the scene #1 is "3", and the scene #1 spans the PlayItem #1 and the PlayItem #2. The PlayItem #1 does not have a multi-angle structure, such that information corresponding to the PlayItem #1 acts as invalid information. The PlayItem #2 has 3 angles and supports a corresponding angle, such that it acts as valid information. Therefore, the player reproduces the scene #1 at a default angle in the PlayItem #1, and at an Angle 3 in the PlayItem #2. The angle number "3" is valid at a boundary between the PlayItem #1 and the PlayItem #2, such that the player reproduces the scene #1 corresponding to the boundary at the above Angle 3.

The scene #2 has a predetermined angle number "3", and spans the PlayItems #2~#4. Since the PlayItem #2 has Angle 3, the player selects/reproduces a clip corresponding to the Angle 3, applies a default angle to the PlayItem #3 having no Angle 3, and reproduces data at the Angle 3 in the PlayItem #4. In this way, the angle number of the scene #3 is "4", and the scene #3 spans the PlayItems #2~#4, such that attribute for specifying individual angles is invalid in the PlayItems #2 and #3, the scene #3 is reproduced at a default angle. In the PlayItem #4, data corresponding to the Angle 4 is reproduced.

FIGS. 8A~8B are conceptual diagrams illustrating processes for searching for content data from a multi-angle title, and performing data reproduction according to the present invention.

Referring to FIG. 8A, searched scenes for the scenetype #1 are denoted by a scene #1 and a scene #2 in the order of entry_points. If a user selects certain scene of the searched scenes to start playback the result, and the player supports a highlight playback scenario among reproduction scenarios, data is sequentially reproduced as shown in FIG. 8A.

The present invention is characterized in that attribute of a corresponding angle is valid within a PlayItem supporting the corresponding angle. Therefore, a default angle is applied at the start of the scene #1 in the PlayItem #1, and Angle 3 is applied in the PlayItem #2 and at the boundary between the PlayItems #1 and #2. A reproduction point moves from the end of the scene #1 to the next scene #2 to successively reproduce the scenes #1 and #2, and then the scene #2 is reproduced at a default angle in the PlayItem #3.

FIG. 8B shows searched scenes associated with the scenetype #2. Individual searched scenes have the same scene start points on the PlayList global time axis. In other words, the searched scenes have entry_points overlapped with each other, such that they are denoted by the scene #3 and the scene #4 in the order of angle numbers.

The present invention is characterized in that different attributes for specifying angles are assigned to individual scenes, such that at least two scenes overlapped with each other can be found from the PlayList global time axis.

Similar to FIG. 8A, selects certain scene of the searched scenes to start playback the result and the player supports a highlight playback scenario among reproduction scenarios, corresponding data is sequentially reproduced as shown in FIG. 8B. The Angle 3 is applied when the scene #3 starts, the scene #3 is reproduced at a default angle in the PlayItem #3 and is reproduced at the angle 3 in the PlayItem #4. A reproduction point moves from the end of the scene #3 to the next scene #4 to successively reproduce the scenes #3 and #4, resulting in the continuation of data reproduction. In this case, since the angle number of the scene #4 is "4", it is invalid in the PlayItem #2 including the start point of the scene #4, and the scene #4 is therefore reproduced at the default angle. In scene #4, the Angle 4 is applied in the PlayItem #4 capable of supporting a corresponding angle.

In association with the above-mentioned description, a variety of reproduction scenarios depending on player's support information may be used as presentation scenarios after a content search process is completed. For example, the aforementioned highlight playback scenario for sequentially reproducing the searched scenes, a simple playback scenario for continuously executing only a simple playback function from an entry_point of a user-selected scene, and a "Scene by Scene Playback" scenario which reproduces only the user-selected scene from among the searched scenes and waits for the user's next selection, may be used as the aforementioned playback scenarios.

Figure 9:
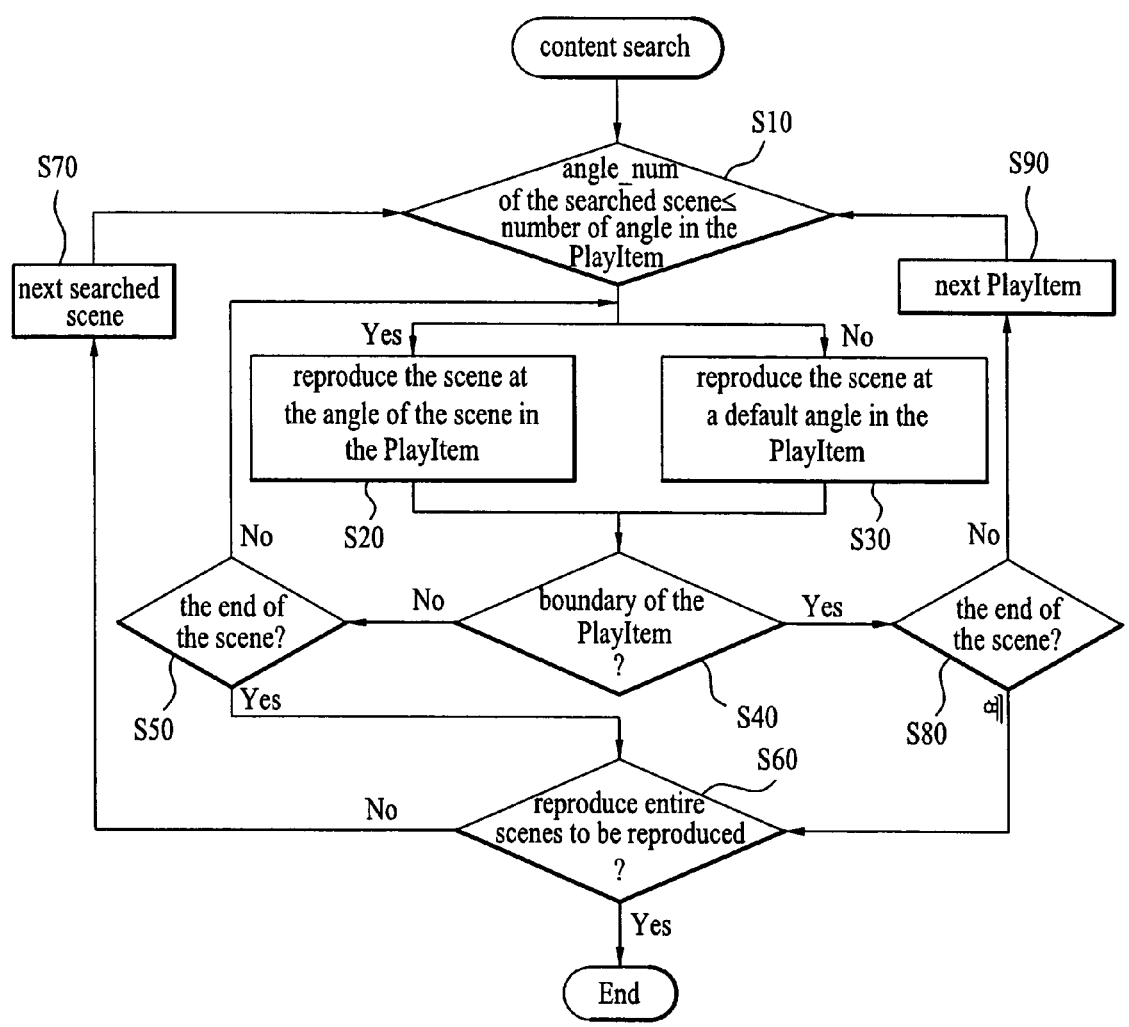
FIG. 9 is a flow chart illustrating a method for searching for content data, and reproducing the searched content data according to the present invention.

FIG. 9 is a flow chart illustrating a method for searching for content data, and reproducing the retrieved content data according to the present invention.

Referring to FIG. 9, if a user enters a reproduction command after a content search process is completed, the player shall select a proper clip when the searched scene has attribute associated with an angle, and must reproduce data of the selected clip at a proper angle. Therefore, it is determined whether attribute for specifying angles of the searched scene is valid in a corresponding PlayItem at step S10.

If it is determined that the attribute is valid at step S10, the searched scene is reproduced at the angle of the scene at step S20. That is, the clip corresponding to the angle of the scene is reproduced if the attribute is valid in the PlayItem. If it is determined that the attribute is invalid at step S20, the searched scene is reproduced at the default angle at step S30.

If the currently-reproduced scene is entirely reproduced at step S50 before a reproduction position reaches the boundary of the PlayItem at step S40 and all scenes to be reproduced are reproduced according to a user command or a playback scenario at step S60, the reproduction process is terminated. For example, referring to the preferred embodiment of FIG. 6, if the highlight playback scenario or the "Scene by Scene Playback" scenario is performed as a reproduction scenario and the searched scene is reproduced, the reproduction process is terminated.

However, if other scenes to be reproduced remain, a reproduction position moves to the next scene at step S70, and it is determined whether attribute for specifying angles of the above scene is valid in a corresponding PlayItem at step S10. For example, referring to the preferred embodiment of FIG. 8A, if the scene #1 is entirely reproduced at the PlayItem #2, and the scene #2 must be reproduced, the above step S10 is performed.

If a reproduction position reaches the boundary of the PlayItem during a data reproduction at step S40, and current scene is entirely reproduced at step S80, it is determined whether all scenes to be reproduced are terminated at step S60. If it is determined that the currently-reproduced scene is not ended, the reproduction position moves to the next PlayItem at step S90, and an operation step returns to the above step S10 for determining whether the attribute for specifying a angle of the currently-reproduced scene is valid in the aforementioned PlayItem. For example, if the scene #1 reproduced by the PlayItem #1 must be reproduced by the PlayItem #2 as shown in FIG. 8A, the operation step returns to the above step S10. The above-mentioned reproduction methods are continued until all scenes to be reproduced according to a reproduction scenario supported by the player are completely reproduced.

In association with the above-mentioned description, the process for determining whether the attribute for specifying angles of the searched scenes is valid in a corresponding PlayItem has been described in FIG. 9 in terms of the above step S10 in which the angle number (angle_num) of the scene is compared with the number of angles of the PlayItem. However, It should be noted that the aforementioned process can also be implemented with other methods and representations contained in the same technical scope as that of the present invention as necessary.

Figure 10:
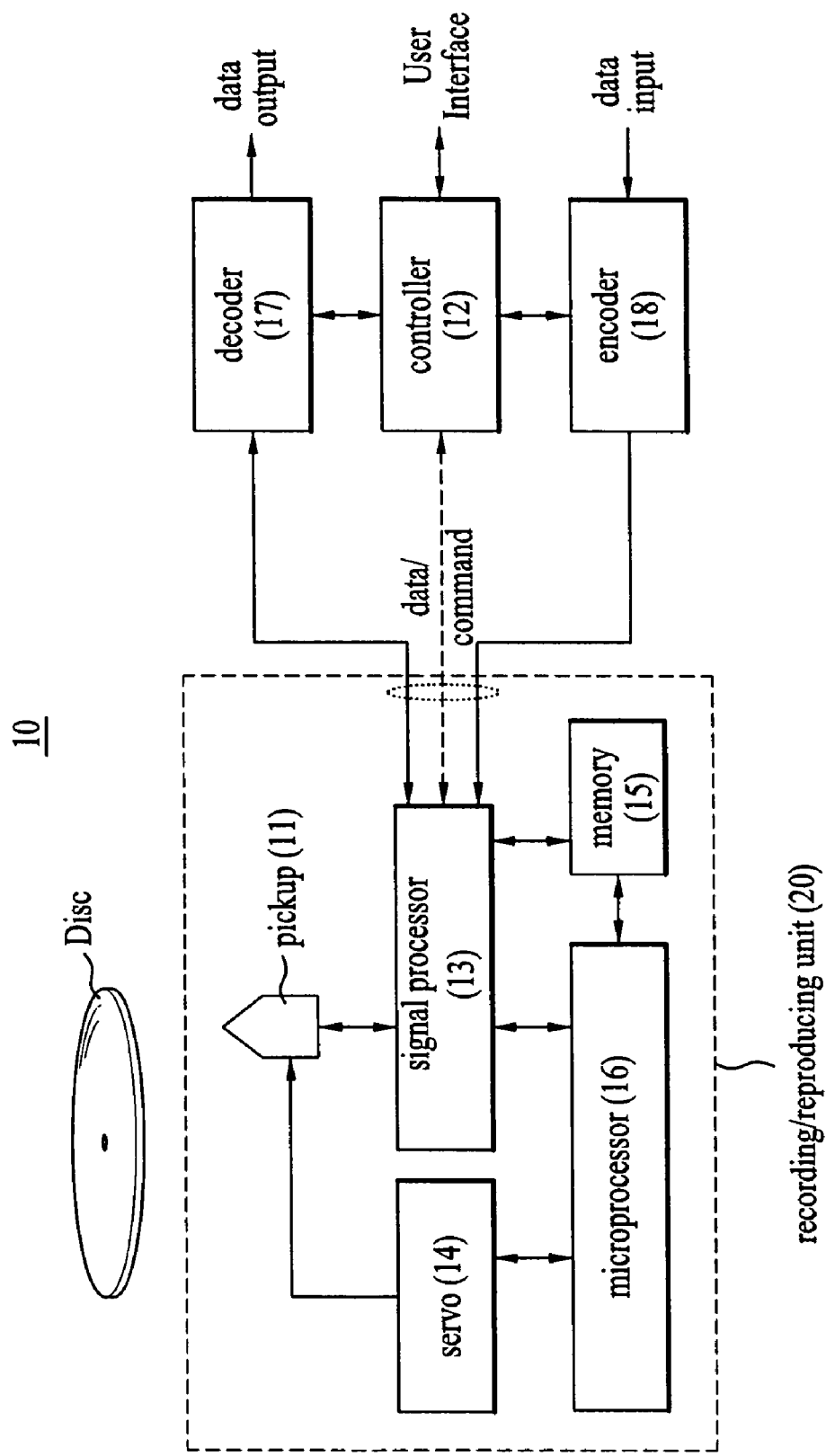
FIG. 10 is a block diagram illustrating an optical recording/reproducing device according to the present invention.

FIG. 10 is a block diagram illustrating an optical recording/reproducing device according to the present invention.

The optical recording/reproducing device 10 according to the present invention will hereinafter be described with reference to FIG. 10.

Referring to FIG. 10, the optical recording/reproducing device 10 includes a pickup unit 11, a servo unit 14, a signal processor 13, a memory 15, and a microprocessor 16. The pickup unit 11 reads content data recorded in a stream area of an optical disc, and reads management information including file information recorded in a management area. The servo unit 14 controls operations of the pickup unit 11. The signal processor 13 receives a reproduction signal from the pickup unit 11, restores the received reproduction signal to a desired signal value, or modulates a signal to be recorded into another signal recorded in the optical disc, such that it transmits the recovered or modulated result. The memory 15 stores information needed for reproducing data of the disc. The microprocessor 16 controls overall operations of the above-mentioned components contained in the optical recording/reproducing device 10. In association with the above-mentioned operations, the combination of the above-mentioned components 11, 14, 13, 15, and 16 is also called a recording/reproducing unit 20, and the recording/reproducing unit 20 can be manufactured in the form of a single product.

A decoder 17 finally decodes output data upon receiving a control signal from the controller 12, and provides the user with the decoded result.

An encoder 18 converts an input signal into a specific format signal (e.g., an MPEG2 transport stream) upon receiving a control signal from the controller 12, and transmits the converted result to the signal processor 13.

A controller 12 controls all the constituent components shown in FIG. 10. Specifically, the controller 12 receives a reproduction command of a specific title or a command for searching for content data from the title by interfacing with a user according to the present invention. In addition, the controller 12 controls the searched scene to be reproduced by attribute for specifying angles of the searched scene upon receiving a command from the user.

The aforementioned content search method according to the present invention receives a content search command from the controller 12, provides a user with scene element contained in a scene, and provides a scene corresponding to the selected scene element from among the scene element. In this case, not only scenes specified by other attributes (e.g., "entry_point" or "duration" information), but also other scenes specified by individual angles are provided to the user. Therefore, the present invention can search for content data on the condition that individual scenes are specified according to angles. Moreover, although scenes are overlapped with each other on the PlayList global time axis, the scenes can be searched while being specified if they have different angles.

The method for reproducing data from the recording medium according to the present invention searches for content data according to a content search command of the controller. If the content data supports a multi-angle, the present invention provides at least one scene including attribute for specifying individual angles, selects a clip corresponding to the selected scene according to attribute for specifying an angle of the selected scheme, and reproduces a stream of the selected clip using the decoder, such that data of the recording medium can be reproduced.

If the searched scene spans more than one PlayItems, the present invention determines whether attribute for specifying the angle according to individual PlayItems is valid. If it is determined that the attribute is valid, the present invention reproduces a stream of the clip corresponding to the angle of the scene. Otherwise, if it is determined that the attribute is valid, the present invention reproduces a stream of the clip corresponding to a default angle.

As apparent from the above description, a recording medium, a method for searching for content data from the recording medium, and a method and apparatus for reproducing data from the recording medium according to the present invention can easily search for a variety of content data recorded in the recording medium, can provide the searched result, and can effectively reproduce/manage data of the recording medium, resulting in the creation of more convenient functions for a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of generating metadata related to a recording medium, comprising:
   generating, with a controller, a metadata file for scene search, the metadata file including metadata about a scene constituting content; and
   positioning, with a controller, the metadata file under a metadata directory of the recording medium,
   wherein the metadata file has a file name indicating that the metadata file is for scene search, and the file name starts with a predetermined prefix "esmt" which indicates that the metadata file is for scene search.

2. The method of claim 1, further comprising:
   generating, with a controller, another metadata file for recording medium library, the another metadata file including metadata about the recording medium itself; and
   positioning, with a controller, the another metadata file under the metadata directory,
   wherein the another metadata file has a file name different from the metadata file for scene search and indicating that the another metadata file is for disc library.

3. The method of claim 2, wherein the file name of the another metadata file starts with 'bdmt' which indicates that the another metadata file is for disc library.

4. The method of claim 1, wherein the metadata file is generated per language and the file name of the metadata file includes a language code corresponding to a language used in the metadata file.

5. The method of claim 1, wherein the metadata file is generated per playlist and the file name of the metadata file includes playlist id linking the metadata file to a specific playlist.

6. The method of claim 1, wherein the file name of the metadata file starts with the prefix 'esmt', and is followed by a three-lettered language code indicating a language used in the metadata and a five-digit playlist id.

7. An apparatus for generating metadata related to a recording medium, comprising a control unit configured to
   generate a metadata file for scene search, the metadata file including metadata about a scene constituting content; and
   position the metadata file under a metadata directory of the recording medium,
   wherein the metadata file has a file name indicating that the metadata file is for scene search, and the file name starts with a predetermined prefix "esmt" which indicates that the metadata file is for scene search.

8. The apparatus of claim 7, wherein the control unit is configured to generate another metadata file for recording medium library, the another metadata file including metadata about the recording medium itself, and positions the another metadata file under the metadata directory,
   wherein the another metadata file has a file name different from the metadata file for scene search and indicating that the another metadata file is for disc library.

9. The apparatus of claim 8, wherein the file name of the another metadata file starts with 'bdmt' which indicates that the another metadata file is for disc library.

10. The apparatus of claim 7, wherein the control unit is configured to generate the metadata file per language and the file name of the metadata file includes a language code corresponding to a language used in the metadata file.

11. The apparatus of claim 7, wherein the control unit is configured to generate the metadata file per playlist and the file name of the metadata file includes playlist id linking the metadata file to a specific playlist.

12. The apparatus of claim 7, wherein the file name of the metadata file starts with the prefix 'esmt', and is followed by a three-lettered language code indicating a language used in the metadata and a five-digit playlist id.

13. The apparatus of claim 7, further comprising:
    a pickup unit configured to record the metadata file on the recording medium.

14. The apparatus of claim 13, further comprising:
    a microprocessor configured to control the pickup unit to record the metadata file on the recording medium according to a command transmitted from the control unit.

15. The method of reproducing content consisting of at least one scene from a recording medium, comprising:
    checking, with a controller, a file name of a metadata file to determine whether the metadata file is for scene search, the file name starting with a predetermined prefix 'esmt' which indicates that the metadata file is for scene search;
    reproducing, with a controller, metadata included in the metadata file if the metadata file is for scene search; and
    searching, with a controller, a scene from the recording medium based on the metadata.

16. The method of claim 15, further comprising:
    checking, with a controller, a language code within the file name to determine which language is used in the metadata file.

17. The method of claim 15, further comprising:
    checking, with a controller, a playlist id within the file name to determine that the metadata file corresponds to a specific playlist.

18. An apparatus for reproducing data from a recording medium, comprising a control unit configured to
    check a file name of a metadata file to determine whether the metadata file is for scene search, the file name starting with a predetermined prefix 'esmt' which indicates that the metadata file is for scene search;
    control metadata included in the metadata file to be reproduced if the metadata file is for scene search; and
    control a scene to be searched from the recording medium based on the metadata.

19. The apparatus of claim 18, wherein the control unit is further configured to check a language code within the file name to determine which language is used in the metadata file.

20. The apparatus of claim 18, wherein the control unit is further configured to check a playlist id within the file name to determine that the metadata file corresponds to a specific playlist.

21. The apparatus of claim 18, further comprising:
a pickup unit configured to read the metadata file from the recording medium.

22. The apparatus of claim 21, further comprising:
a microprocessor configured to control the pickup unit to read the metadata file from the recording medium according to a command transmitted from the control unit.

23. A non-transitory recording medium comprising: a stream area for storing content; and a management area for storing a metadata file for scene search, the metadata file including metadata about a scene constituting the content, wherein the metadata file exists under a metadata directory of the recording medium and has a file name indicating that the metadata file is for scene search, and the file name starts with a predetermined prefix 'esmt' which indicates that the metadata file is for scene search.

24. The non-transitory recording medium of claim 23, wherein the management area stores another metadata file for recording medium library, the another metadata file including metadata about the recording medium itself, wherein the another metadata file exists under the metadata directory and has a file name starting with 'bdmt' which indicates that the another metadata file is for disc library.

25. The non-transitory recording medium of claim 23, wherein the metadata file is stored per language and the file name of the metadata file includes a language code corresponding to a language used in the metadata file.

26. The non-transitory recording medium of claim 23, wherein the metadata file is stored per playlist and the file name of the metadata file includes playlist id linking the metadata file to a specific play list.

27. The non-transitory recording medium of claim 23, wherein the file name of the metadata file starts with the prefix 'esmt' and is followed by a three-lettered language code indicating a language used in the metadata and a five-digit playlist id.

* * * * *